United States Patent
Yoshizumi et al.

(10) Patent No.: US 6,191,962 B1
(45) Date of Patent: *Feb. 20, 2001

(54) STEP-UP POWER SUPPLY CIRCUIT AND SEMICONDUCTOR INTEGRATED CIRCUIT DEVICE

(75) Inventors: Norio Yoshizumi; Haruyuki Inohana; Akio Ozawa, all of Saitama (JP)

(73) Assignee: Pioneer Corporation, Tokyo (JP)

( * ) Notice: Under 35 U.S.C. 154(b), the term of this patent shall be extended for 0 days.

This patent is subject to a terminal disclaimer.

(21) Appl. No.: 09/453,472

(22) Filed: Dec. 2, 1999

(30) Foreign Application Priority Data

Dec. 22, 1998 (JP) .................................................. 10-364731

(51) Int. Cl.[7] .............................. H02M 3/18; H02M 7/00; H02M 7/19
(52) U.S. Cl. ................................ 363/60; 363/59; 307/110
(58) Field of Search ......................... 363/59, 60; 307/110

(56) References Cited

U.S. PATENT DOCUMENTS

| | | | |
|---|---|---|---|
| 5,111,375 | * 5/1992 | Marshall | 363/60 |
| 5,625,544 | * 4/1997 | Kowshik et al. | 363/59 |
| 5,907,484 | * 5/1999 | Kowshik et al. | 363/60 |
| 5,939,866 | * 8/1999 | Bjorkengren | 363/60 |
| 5,973,546 | * 10/1999 | Le et al. | 363/60 |
| 6,008,690 | * 12/1999 | Takeshima et al. | 363/60 |

\* cited by examiner

Primary Examiner—Peter S. Wong
Assistant Examiner—Bao Q. Vu
(74) Attorney, Agent, or Firm—Sughrue, Mion, Zinn, Macpeak & Seas, PLLC

(57) ABSTRACT

A step-up power supply circuit is provided with a diode D1 to which a predetermined voltage Vcc is applied from a power supply 16, a capacitor $C_{D1}$ connected to the diode D1, a diode D2 connected to a joint point between the diode D1 and the capacitor $C_{D1}$, and also a capacitor $C_{D2}$ connected to the diode D2. A trapezoidal wave signal $S_D$ produced by a triangular wave generating circuit 7, an amplifier 8, and a drive unit 9 is applied to the capacitor $C_{D1}$ so as to turn ON/OFF the diodes D1 and D2. As a result, a step-up voltage HVcc approximately two times higher than the voltage Vcc is produced across the capacitor $C_{D2}$. Amplifiers $AM_0$ to $AM_n$ are operated under the step-up voltage HVcc produced from the step-up power supply circuit with employment of this arrangement, and the step-up voltage HVcc is judged by a judging circuit 17. As a result of this judgement, amplification factors of amplifiers $AM_0$ to $AM_n$ are automatically and variably adjusted.

21 Claims, 8 Drawing Sheets

$$G_v = 1 + \frac{r8}{r9 + r10}$$

$$G_v = 1 + \frac{r8 + r9}{r10}$$

FIG. 8

| VOLTAGE Vin | OUTPUT C18 OF COMPARATOR 18 | OUTPUT C19 OF COMPARATOR 19 | JUDGING SIGNAL JD1 | JUDGING SIGNAL JD2 | SWITCHING CIRCUIT SW 1 | SWITCHING CIRCUIT SW 2 |
|---|---|---|---|---|---|---|
| $V_{ref1} \leq V_{in} < V_{ref2}$ | "L" | "H" | "H" | "L" | OFF | ON |
| $V_{ref1} < V_{ref2} \leq V_{in}$ | "H" | "L" | "L" | "H" | ON | OFF |

STEP-UP POWER SUPPLY CIRCUIT AND SEMICONDUCTOR INTEGRATED CIRCUIT DEVICE

BACKGROUND OF THE INVENTION

1. Field of the Invention

The present invention is related to a step-up power supply circuit for producing a higher step-up voltage than a preselected power supply voltage, and also to a semiconductor integrated circuit device equipped with the step-up power supply circuit.

2.

Conventionally, in an electronic appliance with employment of a dry cell and an on-vehicle battery, having relatively low output voltages, a step-up power supply circuit is provided. The step-up power supply circuit produces a step-up voltage in response to the output voltage of the above-described power supply. This step-up voltage is used as an operating power supply voltage in this electronic appliance.

FIG. 11 represents an example of an electronic appliance arranged by employing the above-described conventional step-up power supply circuit 1 and a semiconductor integrated circuit device 2 having a plurality of amplifiers $AM_0$ to $AM_3$. In this drawing, the step-up power supply circuit 1 is equipped with a rectangular wave generating circuit 4 and a step-up circuit 5, which are operated under a power supply voltage Vcc outputted from a power supply 3 such as a dry cell and an on-vehicle battery.

The rectangular wave generating circuit 4 is constituted by an astable multivibrator and the like, which outputs such a rectangular wave Sc. The amplitude of this rectangular wave is rapidly inverted in a predetermined time period. The step-up circuit 5 is arranged by a voltage doubler rectifying circuit equipped with a rectifying diode and a capacitor. The step-up circuit 5 ON/OFF-controls the rectifying diode in synchronism with the rectangular wave Sc to charge the capacitor, so that a step-up voltage HVcc higher than the power supply voltage Vcc is produced.

This step-up voltage HVcc is applied to the semiconductor integrated circuit device 2, and since the amplifiers $AM_0$ to $AM_3$ are operated while using the step-up voltage HVcc as the operating power supply voltage, these amplifiers $AM_0$ to $AM_3$ amplify signals entered into input terminals $IN_0$ to $IN_3$ to thereby output the amplified signals to the respective output terminals $Q_0$ to $Q_3$.

On the other hand, in the above-described conventional step-up power supply circuit 1, since the rectifying diode contained in the step-up circuit 5 is ON/OFF-controlled based upon the rectangular wave Sc containing the radio frequency (high frequency) components, the RF (radio frequency) switching noise is produced from the rectifying diode. There is a problem that this RF switching noise is entered into the amplifiers $AM_0$ to $AM_3$ provided in the semiconductor integrated circuit device 2 and then is mixed with the respective amplified signals derived from the output terminals $Q_0$ to $Q_3$.

Also, there is another problem that in order to prevent adverse influences caused by the switching noise, a total number of externally provided components such as the noise absorbing capacitors, resistors, or coils is increased.

Also, in order to avoid the above-explained adverse influence caused by the switching noise given to the semiconductor integrated circuit device 2, since the step-up power supply circuit 1 and the semiconductor integrated circuit device 2 are separately arranged from each other, a total number of electronic component would be increased. Furthermore, it is practically difficult to realize a high-performance electronic appliance within a limited volume in a high density. Also, it is practically difficult to realize such a semiconductor integrated circuit device containing the conventional step-up power supply circuit 1, and also the amplifiers $AM_0$ to $AM_3$ which are susceptible to the noise adverse influence.

When the step-up voltage HVcc produced by the step-up circuit 5 is used as the operating power supply voltage to drive the amplifiers $AM_0$ to $AM_3$, there is such an effect that the dynamic range can be improved. However, in order to actually achieve this effect, the amplification factors of the amplifiers $AM_0$ to $AM_3$ is required to be increased in response to the increase in the stepped-up operating power supply voltage.

That is to say, in such a case that both the amplitudes of the input signals entered into the amplifiers $AM_0$ to $AM_3$, and the amplification factors of the amplifiers $AM_0$ to $AM_3$ are the same as those of each other irrespective to high/low operating power supply voltages of the amplifiers $AM_0$ to $AM_3$, the output signals outputted from the amplifiers $AM_0$ to $AM_3$ are equal to each other irrespective of the high/low operating power supply voltages. As a result, in order to actually achieve the effect of the wide dynamic range, the amplification factors of the amplifiers $AM_0$ to $AM_3$ are required to be increased in response to increasing of the operating power supply voltage.

However, conventionally, while the variable resistors and the like are connected to the amplification factor adjusting terminals provided with the amplifiers $AM_0$ to $AM_3$, the amplification factors are adjusted by manually adjusting the values of the variable resistors. As a result, there are problems that the adjusting work becomes cumbersome, and furthermore, the externally provided electronic components such as the above-explained variable resistors are required, which induces an increase of total numbers of such electronic components.

SUMMARY OF THE INVENTION

The present invention has been made to solve the conventional problems, and therefore, has an object to provide a step-up power supply circuit capable of suppressing an occurrence of noise, and also to provide a semiconductor integrated circuit device capable of automatically self-adjusting an optimum operating condition in response to a stepped-up voltage.

To achieve the above-described object, a step-up power supply circuit, according to an aspect of the present invention, is featured by comprising a first rectifying element and a first capacitive element series-connected between a first contact point and a second contact point; a second rectifying element connected between a joint point between the first rectifying element and the first capacitive element, and a third contact point; a second capacitive element connected between the third contact point and a fourth contact point; and drive means for outputting a signal having a waveform whose amplitude is not rapidly changed, but becomes constant every predetermined time period; wherein: plural sets containing the first/second rectifying elements and the first/second capacitive elements are cascade-connected to each other in a plurality of stages; the first contact point of a post-staged set is connected to the third contact point of a pre-staged set; the second contact point is commonly connected; a predetermined power supply voltage is applied to the first contact point of a topmost-staged set; the signal of the drive means is supplied to the second contact point of the topmost-staged set; and the fourth contact point is set to a lower voltage than the predetermined voltage.

In accordance with the step-up power supply circuit having this arrangement, when the signal derived from the drive means is applied to the second terminal, biases of the first and second rectifying elements of each set are alternately inverted in response to a change in amplitudes of this signal, so that the ON/OFF switching operation is carried out. The first and second capacitive elements of each set are charged by this ON/OFF switching operation, a step-up voltage substantially two times higher than the power supply voltage is produced across the third terminal of the topmost-staged set. Also, voltages substantially 3 times, and 4 times higher than the power supply voltage are produced across the third terminals of the sets subsequent to the second stage, namely the step-up voltages substantially integer times higher than the power supply voltage are produced across the third terminal.

In this case, since the signal of the drive means is such a signal having a waveform whose amplitude becomes constant every time a preselected time period has passed, but having no rapidly changed amplitudes, this signal corresponds to a signal not having a so-called "RF (radio frequency) component." In response to the amplitude change of this signal, when the first and second rectifying elements are turned ON/OFF, the RF switching noise is not produced from these first and second rectifying elements, but the step-up power supply circuit capable of suppressing the occurrence of the RF switching noise can be realized.

Also, an integrated circuit device equipped with a step-up power supply circuit, according to another aspect of the present invention, is featured by such a semiconductor integrated circuit device equipped with a step-up power supply circuit, in which the step-up power supply circuit and a circuit operated by using a step-up voltage produced from the step-up power supply circuit as an operating power supply voltage are formed on the same semiconductor substrate, comprising: judging means for judging the step-up voltage produced by the step-up power supply circuit; and adjusting means for adjusting an operating condition of the circuit operated by using the step-up voltage as the operating power supply voltage based upon the judged result of the judging means.

In accordance with the semiconductor integrated circuit device having the above-explained arrangement, the step-up voltage produced by the step-up power supply circuit is judged by the judging means, and the operating condition of the above-explained circuit operated by employing this step-up voltage as the operating power supply voltage is automatically adjusted by the adjusting means based upon the judged result of the judging means. As a result, the operating condition of the above-explained circuit is automatically adjusted in response to the step-up voltage produced from the step-up power supply circuit.

Also, the circuit operated by using the step-up voltage as the operating power supply voltage is an amplifier, and the adjusting means adjusts an amplification factor of the circuit. With employment of this arrangement, the amplification factor of the amplifier is automatically adjusted in response to the step-up voltage produced by the step-up power supply circuit. As a consequence, the amplification factor of the amplifier is automatically adjusted by which the wide dynamic range obtained by the step-up voltage can be effectively utilized.

BRIEF DESCRIPTION OF THE DRAWINGS

FIG. 8 is a truth table for explaining operations of the judging circuit and the switching circuit with respect to a step-up voltage;

DETAILED DESCRIPTION OF THE PREFERRED EMBODIMENTS

Figure 1:
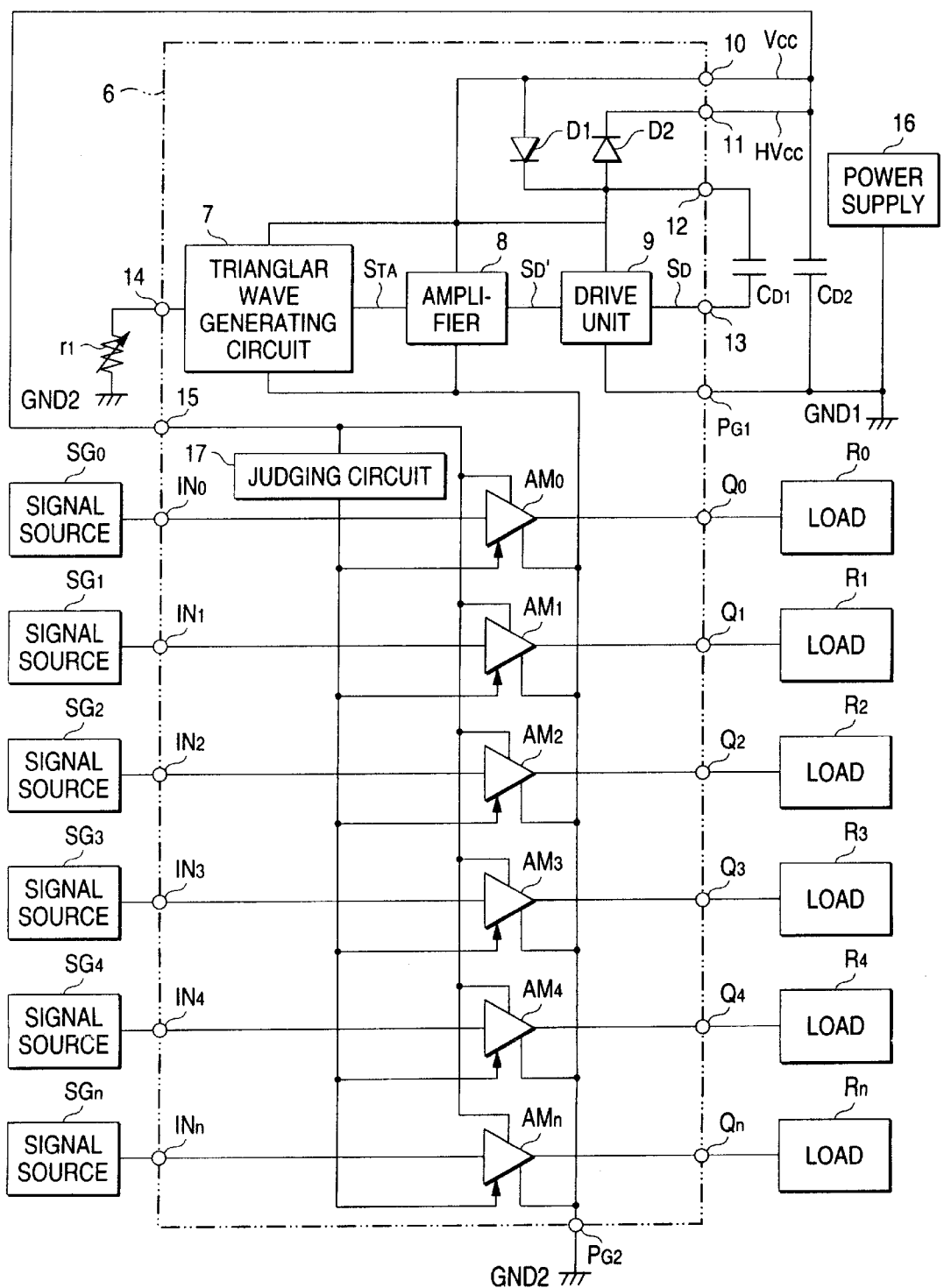
FIG. 1 is a block diagram for showing an arrangement of a step-up power supply circuit and an arrangement of a semiconductor integrated circuit device according to an embodiment of the present invention.

Referring now to drawings, various embodiment modes of the present invention will be described. FIG. 1 is a schematic block diagram for an arrangement of a step-up power supply circuit according to this embodiment mode, and an arrangement of an audio signal amplifying semiconductor integrated circuit device equipped with this step-up power supply circuit.

In this drawing, this semiconductor integrated circuit device 6 owns a single in-line type package structure, or a dual in-line type package structure having a plurality of lead terminals, which is formed as an one chip on the same semiconductor substrate and then is molded in resin by a semiconductor manufacturing process.

The semiconductor integrated circuit device 6 is provided with a triangular wave generating circuit 7, an amplifier 8, a drive unit 9, and rectifying diodes D1/D2 functioning as rectifying elements, which constitute a step-up power supply circuit, and furthermore, "n" sets of amplifiers $AM_0$ to $AM_n$, and a judging circuit 17. These amplifiers $AM_0$ to $AM_n$ amplify plural channels of audio signals to output the amplified audio signals. The judging circuit 17 judges operating power supply voltages of the amplifiers $AM_0$ to $AM_n$ to automatically adjust the respective amplification factors $G_v$ of these amplifiers $AM_0$ to $AM_n$.

Also, this semiconductor integrated circuit device 6 is provided with a ground terminal $P_{G1}$ for setting the ground of the drive unit 9; another ground $P_{G2}$ for setting the grounds of the triangular wave generating circuit 7, the amplifier 8, and the amplifiers $AM_0$ to $AM_n$; input terminals $IN_0$ to $IN_n$ connected to the inputs of the amplifiers $AM_0$ to $AM_n$; and furthermore, output terminals $Q_0$ to $Q_n$ connected to the outputs of the amplifiers $AM_0$ to $AM_n$.

Furthermore, the semiconductor integrated circuit device 6 is provided with a first power supply terminal 10 connected to an anode of the rectifying diode D1; a lead terminal 11 connected to a cathode of the rectifying diode D2; another lead terminal 12 connected to both a cathode of the rectifying diode D1 and an anode of the rectifying diode D2; another lead terminal 13 connected to the output of the drive unit 9; an adjusting terminal 14 for adjusting operation of the triangular wave generating circuit 7; and a second power supply terminal 15 for applying operating power supply voltages to the amplifiers $AM_0$ to $AM_n$.

In this case, the triangular wave generating circuit 7 is constructed of a self-running type oscillator circuit. In the case that an adjusting resistor $r_1$ is connected between an adjusting terminal 14 and the ground terminal $P_{G2}$, and a resistance value of this adjusting resistor $r_1$ is externally adjusted, a triangular waveform signal (will be simply referred to as a "triangular wave" hereinafter) $S_{TA}$ having an oscillation time period is outputted from the triangular wave generating circuit 7 in response to the adjusted resistance value.

Figure 2:
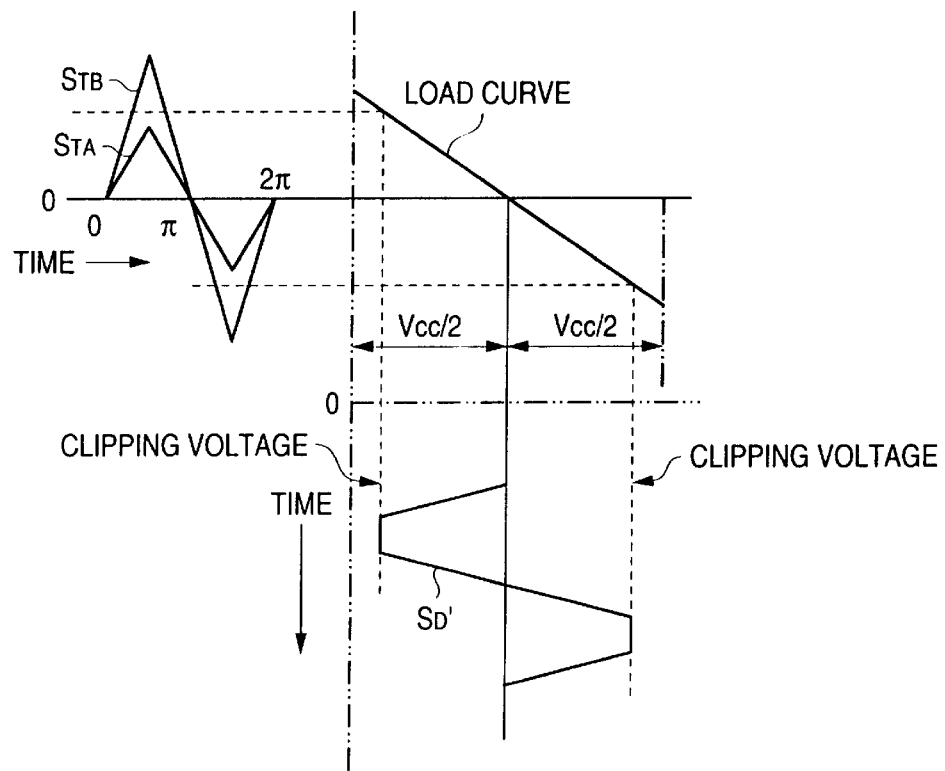
FIG. 2 is an explanatory diagram for indicating a maximum output condition for explaining a basic idea for producing a trapezoidal wave.

The amplifier 8 is provided with a voltage amplifier for amplifying the triangular wave $S_{TA}$ to output a signal $S_D{}'$, and the drive unit 9 is provided with a power amplifier for power-amplifying the signal $S_D{}'$ to output the power-amplified signal $S_D{}'$. The amplifier 8 amplifies the triangle wave $S_{TA}$ so as to output another triangle wave $S_{TB}$ having a large amplitude to a saturation region. As indicated in a maximum output condition of FIG. 2, a trapezoidal waveform signal (will be simply referred to as a "trapezoidal wave" hereinafter) $S_D{}'$ is produced by clipping the signal $S_{TB}$ at a saturation voltage (namely, clip voltage shown in this drawing). This trapezoidal wave $S_D{}'$ is power-amplified by the drive unit 9, and then the drive unit 9 outputs a power-amplified trapezoidal wave $S_D$ to the lead terminal 13.

Figure 3:
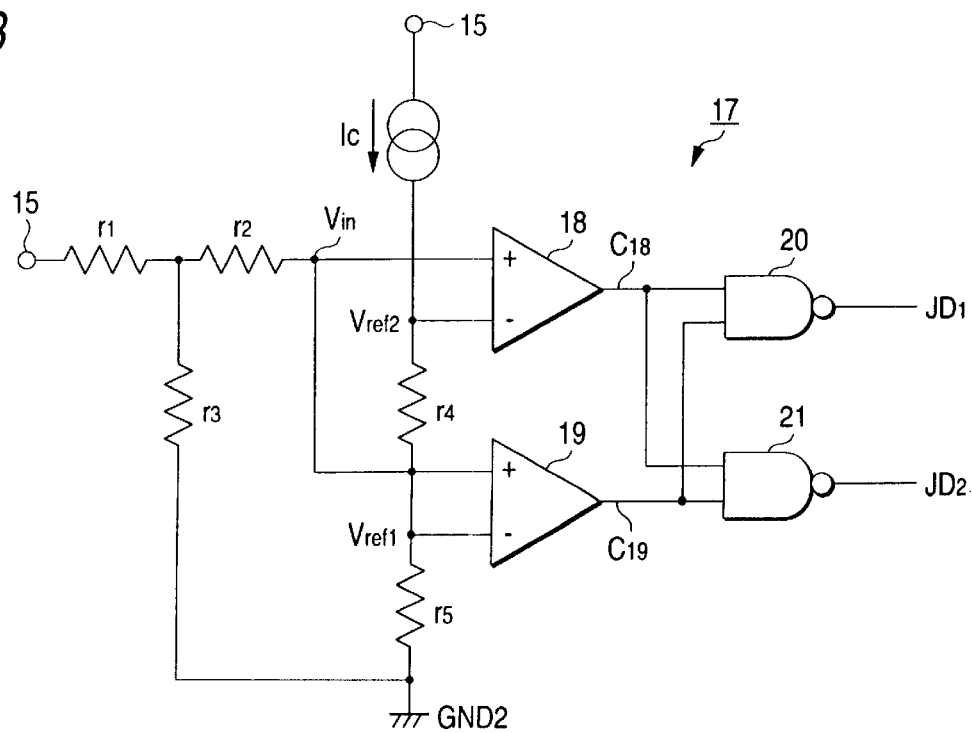
FIG. 3 is a circuit diagram for showing a structural example of a judging circuit.

As shown in FIG. 3, the judging circuit 17 is arranged by employing a comparator 18 and another comparator 19, which have predetermined hysteresis characteristics, and furthermore, a NAND gate 20 and an AND gate 21. Non-inverting input terminals of the comparators 18 and 19 are connected via voltage dividing resistors $r_1$ to $r_3$ to a second power supply terminal 15. A preselected resistance ratio is set to these voltage dividing resistors $r_1$ to $r_3$. A reference voltage $V_{ref1}$ and another reference voltage $V_{ref2}$ are applied to inverting input terminals of the comparators 18 and 19. These reference voltages are produced across the resistors $r_4$ and $r_5$ by receiving a constant current supplied from a constant current source Ic. An output $C_{18}$ and another output $C_{19}$ derived from these comparators 18 and 19 are supplied to the NAND gate 29 and the AND gate 21, respectively.

Then, in such a case that a voltage Vin of the non-inverting input terminals of the comparators 18 and 19 is equal to such a voltage defined between the reference voltage $V_{ref1}$ and the reference voltage $V_{ref2}$, as indicated in a truth table of FIG. 8, the output $C_{18}$ of the comparator 18 becomes a logic level "L", whereas the output $C_{19}$ of the comparator C19 becomes a logic level "H". In response to these logic levels, a judging signal JD1 having a logic level "H" is outputted from the NAND gate 20, and another judging signal JD2 having a logic level "L" is outputted from the AND gate 21.

On the other hand, in such a case that the voltage Vin of the non-inverting input terminals of the comparators 18 and 19 is higher than the reference voltage $V_{ref1}$ and $V_{ref2}$, both the outputs $C_{18}$ and $C_{19}$ of the comparators 18 and 19 become logic levels "H". In response to this logic level "H", both a judging signal JD1 having a logic "L" and another judging signal JD2 having a logic "H" are outputted from the NAND gate 20 and the AND gate 21, respectively.

It should be noted that both the reference voltages $V_{ref1}$ and $V_{ref2}$ are set with respect to the power supply 16 for generating the known voltage Vcc. That is, the reference voltage $V_{ref1}$ is set to be approximately two times higher than this known voltage Vcc, and also to be a voltage lower than 3 times higher voltage direct proportional to the step-up voltage HVcc. The reference voltage $V_{ref2}$ is set to such a step-up voltage approximately 3 times higher than this voltage Vcc.

Next, a description will now be made of basic arrangements of the amplifiers $AM_0$ to $AM_n$ with reference to FIG. 4. It should also be understood that since any of these amplifiers $AM_0$ to $AM_n$ own the same arrangement, the arrangement of the amplifier $AM_0$ is typically explained.

Figure 4:
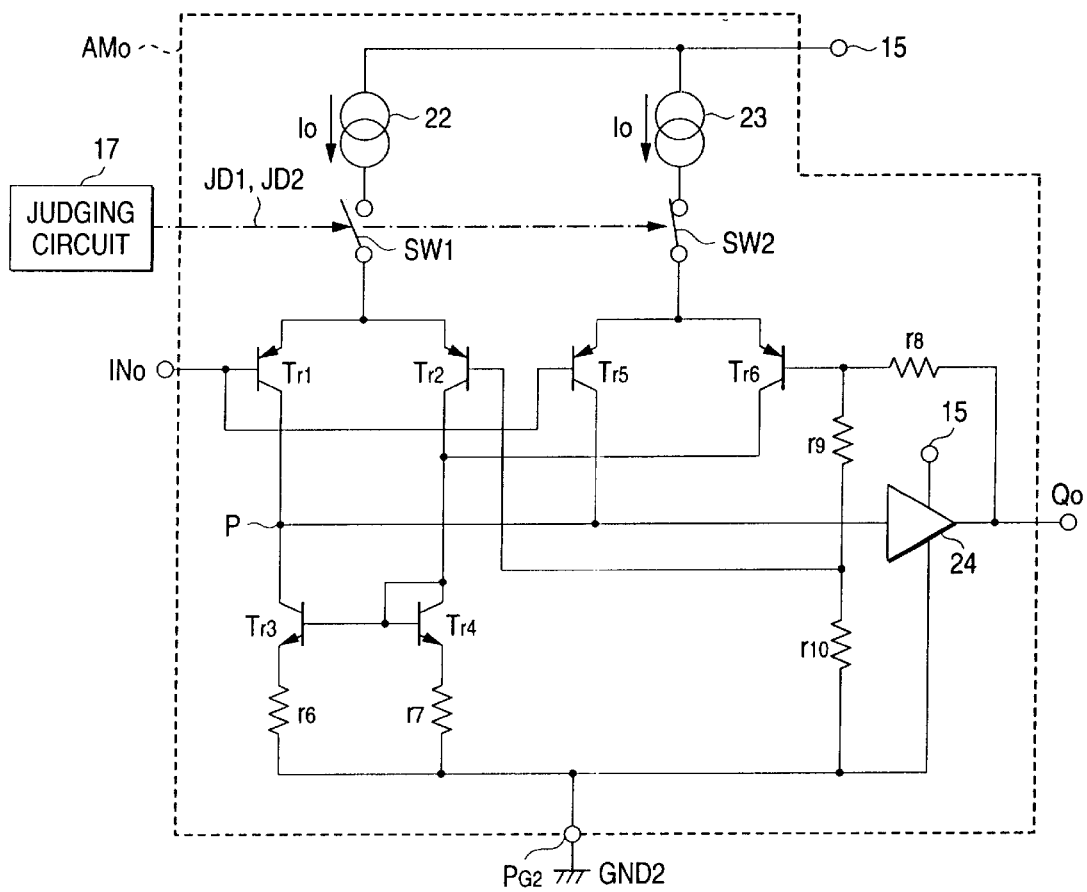
FIG. 4 is a circuit diagram for indicating a structural example of an amplifier.

In FIG. 4, a preamplifier for voltage-amplifying an input signal of an input terminal $IN_0$ is constituted by transistors Tr1 to Tr6, constant current sources 22/23, and resistors $r_6/r_7$. A switching circuit SW1 is connected between a constant current source 22 and the transistors Tr1/Tr2, and is turned ON/OFF in response to the judging signal JD1 supplied from the judging circuit 17. Another switching circuit is connected between another constant current source 23 and the transistors Tr5/Tr6, and is turned ON/OFF in response to the judging signal JD2 supplied from the judging circuit 17. Both the constant current sources 22 and 23 are commonly connected to the second power supply terminal 15.

The transistors Tr1 and Tr2 constitute a differential pair, while the emitters thereof are commonly connected via the switching circuit SW1 to the constant current source 22, whereas the transistors Tr5 and Tr6 constitute another differential pair, while the emitters thereof are commonly connected via the switching circuit SW2 to the constant current source 23. Both the transistors Tr3/Tr4 and the resistors $r_6/r_7$ will constitute active loads with respect to the differential pair arranged by the transistors Tr1 and Tr2, and also the differential pair arranged by the transistors Tr5 and Tr6. An amplifier 24 for performing a voltage amplification and a power amplification is connected to the collector P of the transistor Tr3, and the output of the amplifier 24 is connected to the output terminal $Q_0$.

Furthermore, a first feedback resistor $r_8$ is connected between the output of the amplifier 24 and the base of the transistor Tr6, a second feedback resistor $r_9$ is connected between the base of the transistor Tr6 and the base of the transistor Tr2, and the resistor $r_{10}$ is connected between the base of the transistor Tr2 and the ground terminal $P_{G2}$.

Figure 5A:
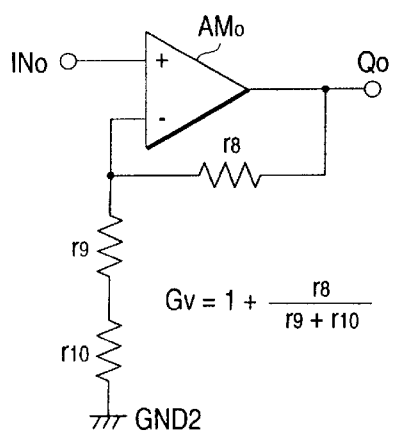
FIGS. 5A and 5B are circuit diagrams for explaining a basic idea for automatically adjudging the amplification factor of the amplifier.

In the amplifier $AM_0$ with employment of the above-described arrangement, when the judging signals JD1 and JD2 supplied from the judging circuit 17 are defined by JD1="H" and also JD2="L", as indicated in FIG. 8, the switching circuit SW1 is brought into an OFF (non-conductive) state and the switching circuit SW2 is brought into ON (conductive) state. As a result, both the transistors Tr1 and Tr2 are not essentially operated, the transistors Tr5/Tr6 and Tr3/Tr4 and the resistors $r_6/r_7$ are brought into a first operating condition, which are operated as a preamplifier. When these circuit elements are brought into this first operating condition, as indicated in FIG. 5A, the amplification factor $G_v$ of the output of the amplifier $AM_0$ with respect to the input thereof is determined by the resistance ratio of the resistors $r_8$ to $r_{10}$ as follows: Gv =1+$r_8$/($r_9$+$r_{10}$).

Figure 5B:
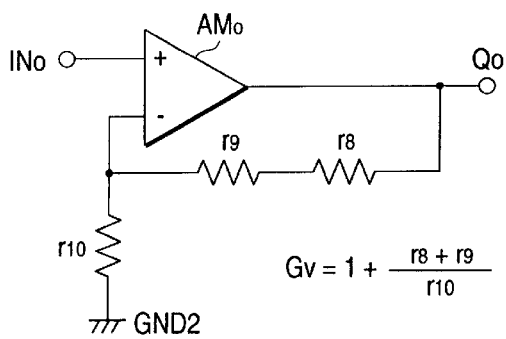

To the contrary, when the judging signals JD1 and JD2 supplied from the judging circuit 17 are defined by JD1="L" and also JD2="H", the switching circuit SW1 is brought into an ON (conductive) state and the switching circuit SW2 is brought into OFF (non-conductive) state. As a result, both the transistors Tr5 and Tr6 are not essentially operated, the transistors Tr1/Tr2 and Tr3/Tr4 and the resistors $r_6/r_7$ are brought into a second operating condition, which are operated as a preamplifier. When these circuit elements are brought into this second operating condition, as indicated in FIG. 5B, the amplification factor $G_v$ of the output of the amplifier $AM_0$ with respect to the input thereof is determined by the resistance ratio of the resistors $r_8$ to $r_{10}$ as follows: $G_v=1+(r_8+r_9)/r_{10}$.

As previously explained, the voltage of the second power supply terminal 15 is judged by the judging circuit 17, and further, both the switching circuits SW1 and SW2 are exclusively turned ON/OFF in response to the judging signals JD1 and JD2 functioning as the judgement results, so that the amplification factors $G_v$ of the amplifiers $AM_0$ to $AM_n$ are switched. As a consequence, the amplification factors $G_v$ of the amplifiers $AM_0$ to $AM_n$ are automatically adjusted in response to the voltage appearing at the second power supply terminal 15.

Now, a use example and operation in this use example of the semiconductor integrated circuit device 6 having the above arrangement will be explained with reference to FIG. 1 to FIG. 7.

In FIG. 1, a power supply 16 is connected between the first power supply terminal 10 and the ground terminal $P_{G1}$. The power supply 16 outputs a relatively low voltage Vcc and corresponds to a dry cell, an on-vehicle battery, and the like. A capacitor $C_{D1}$ is connected between the lead terminals 12 and 13, and a capacitor $C_{D2}$ is connected between the lead terminal 11 and the ground terminal $P_{G1}$. Furthermore, the lead terminal 11 is connected to the second power supply terminal 15, and an adjusting resistor "$r_1$" is connected between the adjusting terminal 14 and the ground terminal $P_{G2}$. External audio signal sources $SG_0$ to $SG_n$ are connected to the input terminals $IN_0$ to $IN_n$, and loads $R_0$ to $R_n$ such as power amplifier circuits for driving external speakers are connected to the output terminals $Q_0$ to $Q_n$.

Also, in the case that this semiconductor integrated circuit device 6 and the external elements such as the capacitors $C_{D1}$ and $C_{D2}$ are mounted to be wired on an electric circuit board, ground wiring patterns GND1 and GND2 which may not give adverse electric influences to each other are formed on an electric circuit board. Then, the drive unit 9, the capacitor $C_{Dl}$, and the ground terminal $P_{G1}$ of the power supply 16 are connected to one ground wiring pattern GND1, whereas the triangular wave generating circuit 7, and the ground terminal $P_{G2}$ of the amplifiers 8 and $AM_0$ to $AM_n$ are connected to the other ground wiring pattern GND2.

Figure 6:
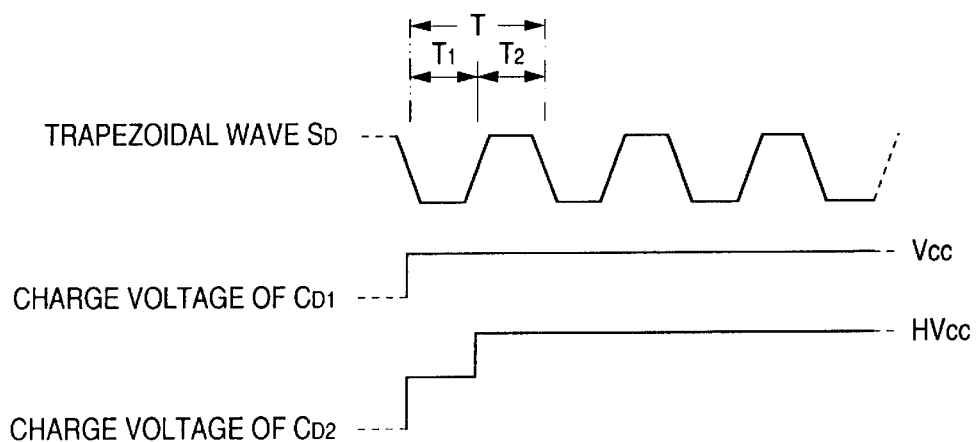
FIG. 6 is a waveform diagram for explaining a basic operation a step-up power supply circuit.

With employment of such a wiring pattern, as shown in FIG. 6, such a trapezoidal wave $S_D$ having a predetermined time period T is supplied to the capacitor $C_{D1}$ and this trapezoidal wave $S_D$ is produced by the triangular wave generating circuit 7, the amplifier 8, and the drive unit 9. The rectifying diode D1 is biased in the forward bias manner to be brought into an ON state, whereas the rectifying diode D2 is biased in the reverse bias manner to be brought into an OFF state in a time period T1 during which the trapezoidal wave $S_D$ becomes a low-leveled clamping voltage. As a result, a current flowing from the power supply 16 via the rectifying diode D1 is charged into the capacitor $C_{D1}$, so that a charge voltage substantially equal to the voltage Vcc of the power supply 16 is produced across the capacitor $C_{D1}$.

On the other hand, in a time period T2 during which the trapezoidal wave $S_D$ becomes a high-leveled clamping voltage, the rectifying diode D1 is brought into an OFF state and the rectifying diode D2 is brought into an ON state. As a result, an added voltage is applied via the rectifying diode D2 to the capacitor $C_{C2}$, so that a step-up voltage HVcc (nearly equal to 2×Vcc) substantially two times higher than the voltage Vcc is produced across the capacitor $C_{D2}$. This added voltage is obtained by adding the high-leveled clamping voltage to the above-explained charge voltage which is charged into the capacitor $C_{D1}$ in the time period T1.

Then, when the voltage of the trapezoidal wave $S_D$ is continuously charged in a predetermined time period T, the charge voltage across the capacitor $C_{D1}$ is maintained at a voltage substantially equal to the voltage Vcc, and also the charge voltage across the capacitor $C_{D2}$ is maintained at the step-up voltage HVcc. Also, since the rectifying diodes D1 and D8 are turned ON/OFF in response to the trapezoidal wave $S_D$ having a smaller RF component than that of the rectangular wave, the RF (radio frequency) switching noise is not produced from the rectifying diodes D1 and D2. As a result, a step-up voltage HVcc from which noise is suppressed is obtained.

The step-up voltage HVcc produced in this manner is applied to the second power supply terminal 15, and while this step-up voltage HVcc is used as the operating power supply voltage, the amplifiers $AM_0$ to $AM_n$ are operated.

Furthermore, the judging circuit 17 detects the step-up voltage HVcc applied to the second power supply terminal 15, and outputs the judging signals JD1 and JD2 in response to the step-up voltage HVcc. In this case, since the voltage Vin applied to the non-inverted input terminals of the comparators 18 and 19 becomes such a voltage between the reference voltages $V_{ref1}$ and $V_{ref2}$, and also the judging signals JD1 and JD2 become JD1="H" and JD2="L", the first operating condition is set. As indicated in FIG. 5A, the amplification factors Gv of the amplifiers $AM_0$ to $AM_n$ are set to $Gv=1+r_8/(r_9+r_{10})$.

As a result, when the higher step-up voltage HVcc (nearly equal to 2×Vcc) than the output voltage Vcc of the power supply 16 is applied to the second power supply terminal 15, the amplification factors Gv of the amplifiers $AM_0$ to $AM_n$ are automatically set to such application factors suitable for the step-up voltage HVcc.

Figure 7:
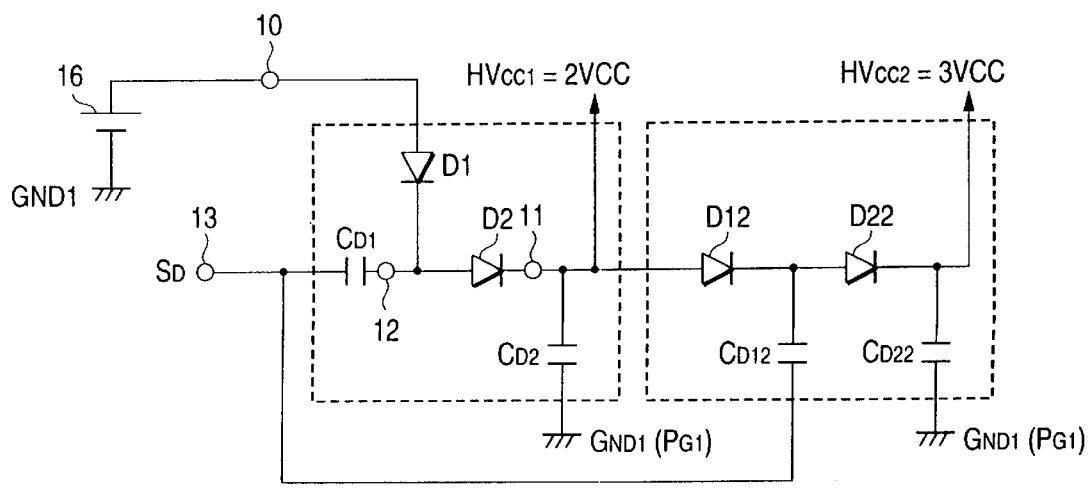
FIG. 7 is a circuit diagram for showing an arrangement of a step-up circuit.

Also, as shown in FIG. 7, in addition to the above-described capacitors $C_{D1}$ and $C_{D2}$, both diodes D12/D22 and capacitors $C_{D12}/C_{D22}$ are further connected, and also the step-up voltage HVcc produced across the capacitor $C_{D22}$ is applied to the second power supply terminal 15. Accordingly, the above-explained second operating state is set.

In other words, the diode D12 corresponding to the rectifying diode D1 and the capacitor $C_{D12}$ corresponding to the capacitor $C_{D1}$ are series-connected between the lead terminals 11 and 13. Also the diode D22 corresponding to the rectifying diode D2 and the capacitor $C_{D22}$ corresponding to the capacitor $C_{D2}$ are series-connected between the cathode of the diode D12 and the ground terminal $P_{G1}$. A joint point between the cathode of the rectifying diode D22 and the capacitor $C_{D22}$ is connected to the second power terminal 15.

When the above-explained wiring line is made, the rectifying diodes D1/D2 and the diodes D12/D22 are repeatedly turned ON/OFF in response to a voltage change in the trapezoidal wave $S_D$ outputted from the rectifying diodes D1/D2, so that the step-up voltage HVcc1 (nearly equal to 2×Vcc) is produced across the capacitor $C_{D2}$, and an added voltage between the step-up voltage HVcc 1 and the voltage Vcc is produced across the capacitor $C_{D22}$ in a similar manner to that of FIG. 6. Namely, the step-up voltage HVcc 2 (nearly equal to 3×Vcc) approximately 3 times higher than the voltage Vcc is produced across this capacitor $C_{D22}$, and then this step-up voltage HVcc is applied to the second power supply terminal 15.

As a consequence, the amplifiers $AM_0$ to $AM_n$ are operated by using the step-up voltage HVcc2 as the operating power supply voltage, and since the judging signals JD1 and JD2 of the judging circuit 17 become JD1="L" and JD2="H" respectively, as shown in FIG. 5B, the amplification factors Gv of the amplifiers $AM_0$ to $AM_n$ are set to an optimum amplification factor $Gv=1+(r_{8+r9})/r_{10}$ in correspondence with the step-up voltage HVcc2.

As previously explained, in accordance with the semiconductor-integrated circuit device 6 according to this embodiment, since the optimum amplification factors of the amplifiers $AM_0$ to $AM_n$ are automatically set in correspondence with the above-explained step-up voltage, the effect of the wide dynamic range set by this step-up voltage can be achieved without the manual adjustment required in the conventional step-up power supply circuit.

Also, since the rectifying diodes D1 and D2 are turned ON/OFF in response to the trapezoidal wave $S_D$ having the smaller RF component than that of the rectangular wave, the RF switching noise is not produced from the rectifying diodes D1 and D2. As a consequence, the conventional problem, namely the switching noise mixture into the amplifiers $AM_0$ to $AM_n$ can be suppressed, so that the audio appliance having the high grade can be realized.

Also, as previously explained, the RF switching noise caused by the rectifying diodes D1 and D2 can be suppressed, it is possible to realize such a semiconductor integrated circuit device 6 that both the amplifiers $AM_0$ to $AM_n$ which are easily adversely influenced by the noise, and the rectifying diodes D1 and D2 which constitute the step-up circuit are formed on the same semiconductor substrate.

Also, since the step-up power supply circuit capable of suppressing the occurrence of noise is built in the semiconductor integrated circuit device 6, when this semiconductor integrated circuit device 6 is used, a total number of electronic components can be reduced. In particular, it is possible to largely reduce a total number of externally provided electronic components such as the capacitors, resistors, or coils used to absorb the noise.

It should be understood in this embodiment mode that, as shown in FIG. 6, the rectifying diodes D1 and D2 are turned ON/OFF by using the trapezoidal wave $S_D$. That is, the inclination of the rising amplitude is substantially equal to that of the falling amplitude in this trapezoidal wave $S_D$. Alternatively, another trapezoidal wave, the rising inclination of which is different from the falling inclination thereof, may be employed.

In the above explanation, since the triangular wave $S_{TB}$ is clipped, the trapezoidal wave $S_D$ is produced. Alternatively, the trapezoidal wave $S_D$ may be produced by clipping a sawtooth wave. In this alternative case, since the triangular wave generating circuit 7 shown in FIG. 1 is replaced by a sawtooth wave generating circuit, the above-explained alternative trapezoidal wave may be realized. Also, the rectifying diodes D1 and D2 may be turned ON/OFF in such a manner that the triangular wave generating circuit 7 shown in FIG. 1 is replaced by a sine wave generating circuit, and the sine wave generated from this sine wave generating circuit is clipped at a level to obtain a signal, and then this signal is supplied to these rectifying diodes D1 and D2.

Also, this embodiment mode has described such a semiconductor integrated circuit device 6 equipped with the judging circuit 17 for judging the step-up voltage approximately 2 times higher than the voltage Vcc of the power supply 16 and the step-up voltage approximately 3 times higher than the voltage Vcc. Than, based upon this judgement result, the respective amplification factors Gv of the amplifiers $AM_0$ to $AM_n$ are automatically adjusted in correspondence with the respective step-up voltages approximately 2 and 3 times higher than the voltage Vcc. However, the present invention is not limited to this embodiment mode.

Figure 9:
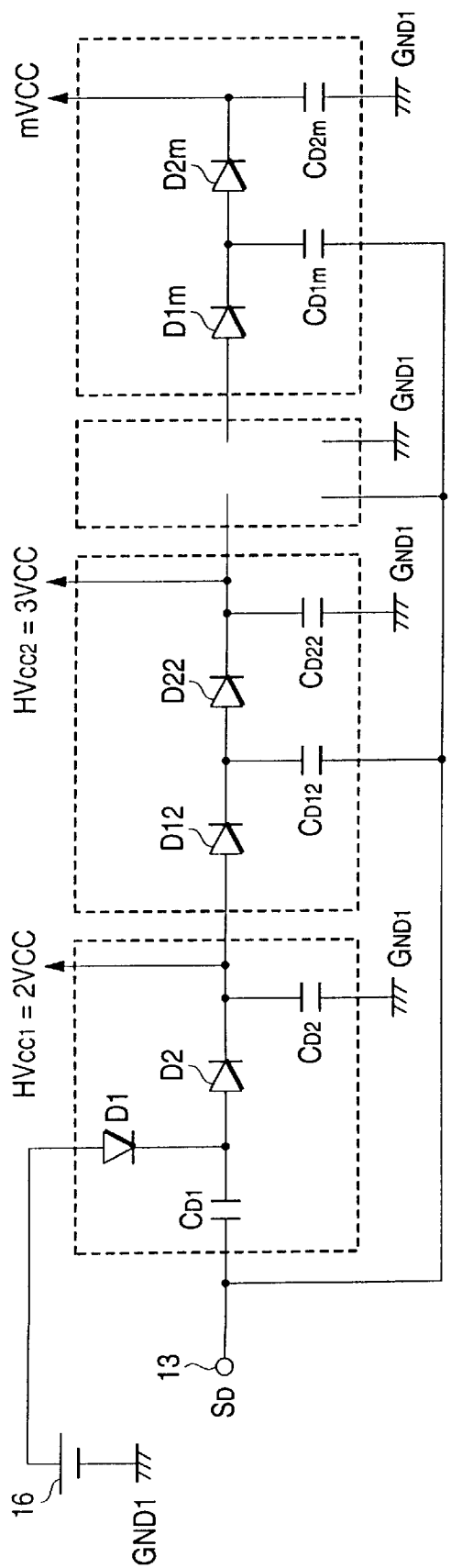
FIG. 9 is a general circuit diagram for indicating an arrangement of the step-up circuit.

That is to say, another step-up power supply circuit according to the present invention is arranged as follows: As indicated in FIG. 9, plural sets of rectifying diodes D12 to D1m and D22 to D2m, and also plural sets of capacitors $C_{D12}$ to $C_{D1m}$ and $C_{D22}$ to $C_{D2m}$m are connected in a cascade connection manner. These plural sets of rectifying diodes D12 to D1m /D22 to D2m correspond to the rectifying diodes D1 and D2. The plural sets of capacitors $C_{D12}$ to $C_{D1m}$/$C_{D22}$ to $C_{D2m}$ correspond to the capacitors $C_{D1}$ and $C_{D2}$. These capacitors $C_{D12}$ to $CD_{D1m}$ are driven by the trapezoidal wave $S_D$ and the like, which are outputted from the drive unit 9, so that step-up voltages 2Vcc to mVcc substantially equal to such a voltage obtained by multiplying the voltage Vcc by an integer can be produced across the respective sets of capacitors $C_{D2}$, $C_{D22}$ to $C_{D2m}$.

As a result, since the reference voltages $V_{ref1}/V_{ref2}$ of the judging circuit 17 and the resistors $r_8$ to $r_{10}$ for setting the amplification factors Gv of the amplifiers $AM_0$ to $AM_n$ are preset in correspondence with a preselected step-up voltage, it is possible to realize such semiconductor integrated circuit devices having various variations.

For instance, the reference voltage $V_{ref1}$ shown in FIG. 3 is set to such a voltage which is directly proportional to a step-up voltage HVccm1 obtained by multiplying the power supply voltage Vcc by an arbitrary integer $m_1$, and also the reference voltage $V_{ref2}$ is set to such a voltage which is directly portional to a step-up voltage HVccm2 obtained by multiplying the power supply voltage Vcc by another arbitrary integer $m_2$ (note that $m_z$ is not equal to $m_1$). Furthermore, the respective resistance values of the resistors $r_8$ to $r_{10}$ for setting the ampliation factors shown in FIG. 4 and FIGS. 5A and 5B may be preset in order that the amplification factor Gv corresponding to the above-explained step-up voltages HVccm1 and HVccm2 can be obtained.

With employment of the above-described arrangement, in the case that the step-up voltage HVccn1 is applied which is produced in an $m_1$-th stage of step-up circuit provided in the step-up power supply circuit shown in FIG. 9, and also in the case that the step-up voltage HVccm2 is applied which is produced in an $m_2$-th stage of step-up circuit provided in this step-up power supply circuit, the respective amplification factors Gv of the amplifiers $AM_0$ to $AM_n$ may be set to optimum amplification factors corresponding to the respective step-up voltages HVccm1 and HVccm2. Also, while the diodes D1, D2, D12 to D1m, and D22 to D2m are turned ON/OFF, since no RF switching noise is produced, it is possible to provide a step-up power supply circuit with low noise.

Also, in the above-described embodiment, the rectifying diodes D1 and D2 used to constitute the step-up circuit are build in the semiconductor integrated circuit 6.

Alternatively, the remaining diodes D12 to D1m and D22 to D2m shown in FIG. 9 may be previously build in the semiconductor integrated circuit 6.

Also, the above-explained embodiment has described such a semiconductor integrated circuit device 6 that the amplification factors Gv of the amplifiers $AM_0$ to $AM_n$ are automatically changed into two stages in response to two sorts of step-up voltages. However, the present invention is not limited to such a semiconductor integrated circuit device for changing the amplification factors Gv into the two stages.

For instance, a semiconductor integrated circuit device corresponding to more than 3 step-up voltages may be realized. That is to say, while more than 3 sets of reference voltages $V_{ref1}$ to $V_{refi}$ are set to the judging circuit 17, step-up voltages applied to the second power supply terminal 15 may be compared with each other based upon these reference voltages $V_{ref1}$ to $V_{refi}$. Furthermore, plural sets of differential pairs, the constant current sources 22/23, and circuits corresponding to the switching circuits SW1/SW2 may be provided, the total number of which correspond to the number "i" ($3 \leq i$) of step-up voltages. Also, feedback resistors corresponding to the resistors $r_8$ to $r_{10}$ may be provided with the respective circuits. These differential pairs are constructed by the transistors Tr1, Tr2, Tr5, Tr6 shown in FIG. 4.

Also, as indicated in FIG. 4, the above-explained embodiment has described such a case that the amplification factors Gv of the amplifiers $AM_0$ to $AM_n$ are variably set by switching the differential pair of the transistors Tr1/Tr2, and the differential pair of the transistors Tr5/Tr6 in response to the step-up voltage supplied to the second power supply terminal 15. The present invention is not limited thereto, but may be applied to other circuit arrangements by which these amplification factors Gv may be changed.

Figure 10:
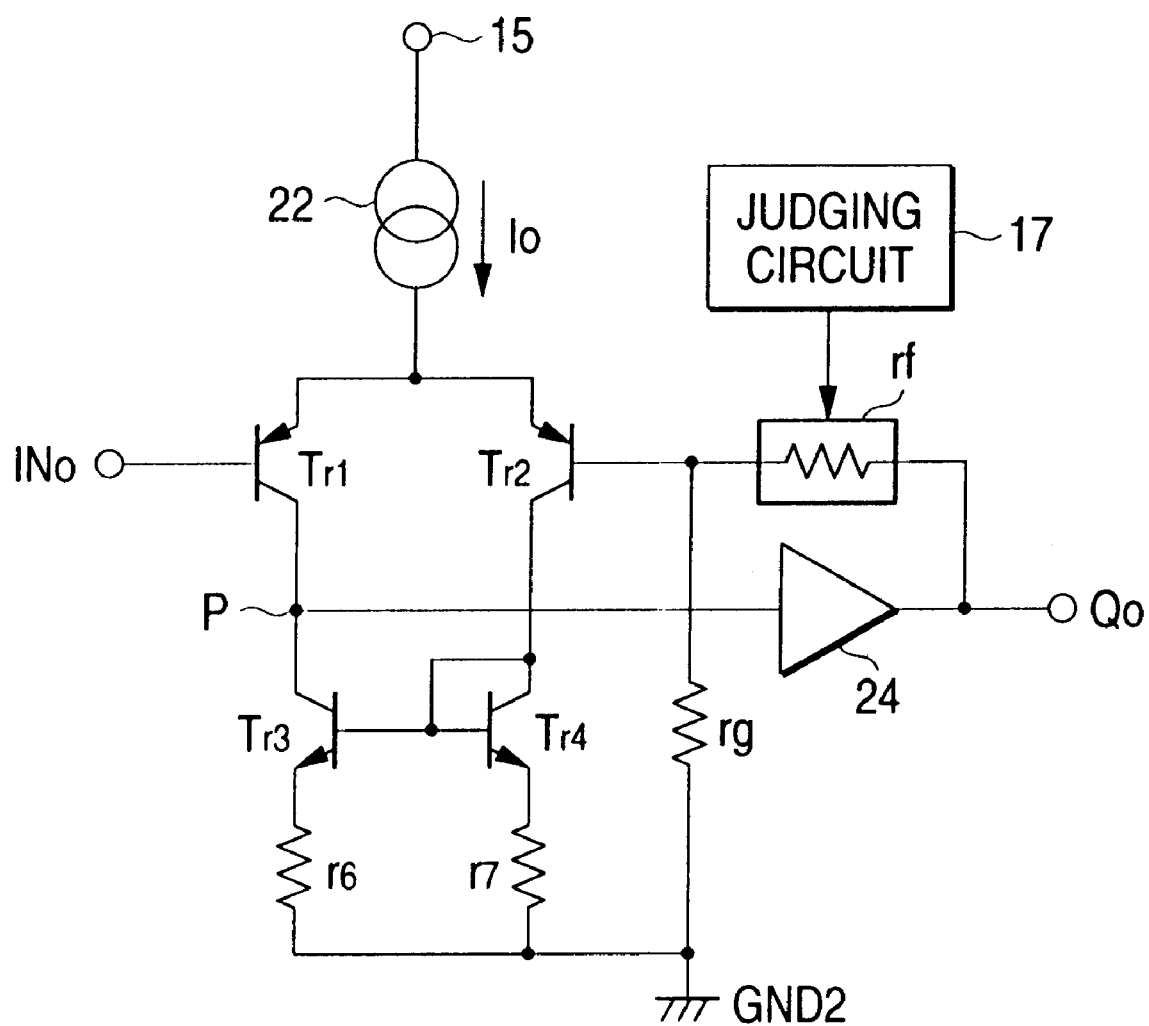
FIG. 10 is a circuit diagram for showing an arrangement of a modification of the amplifier.
Figure 11:
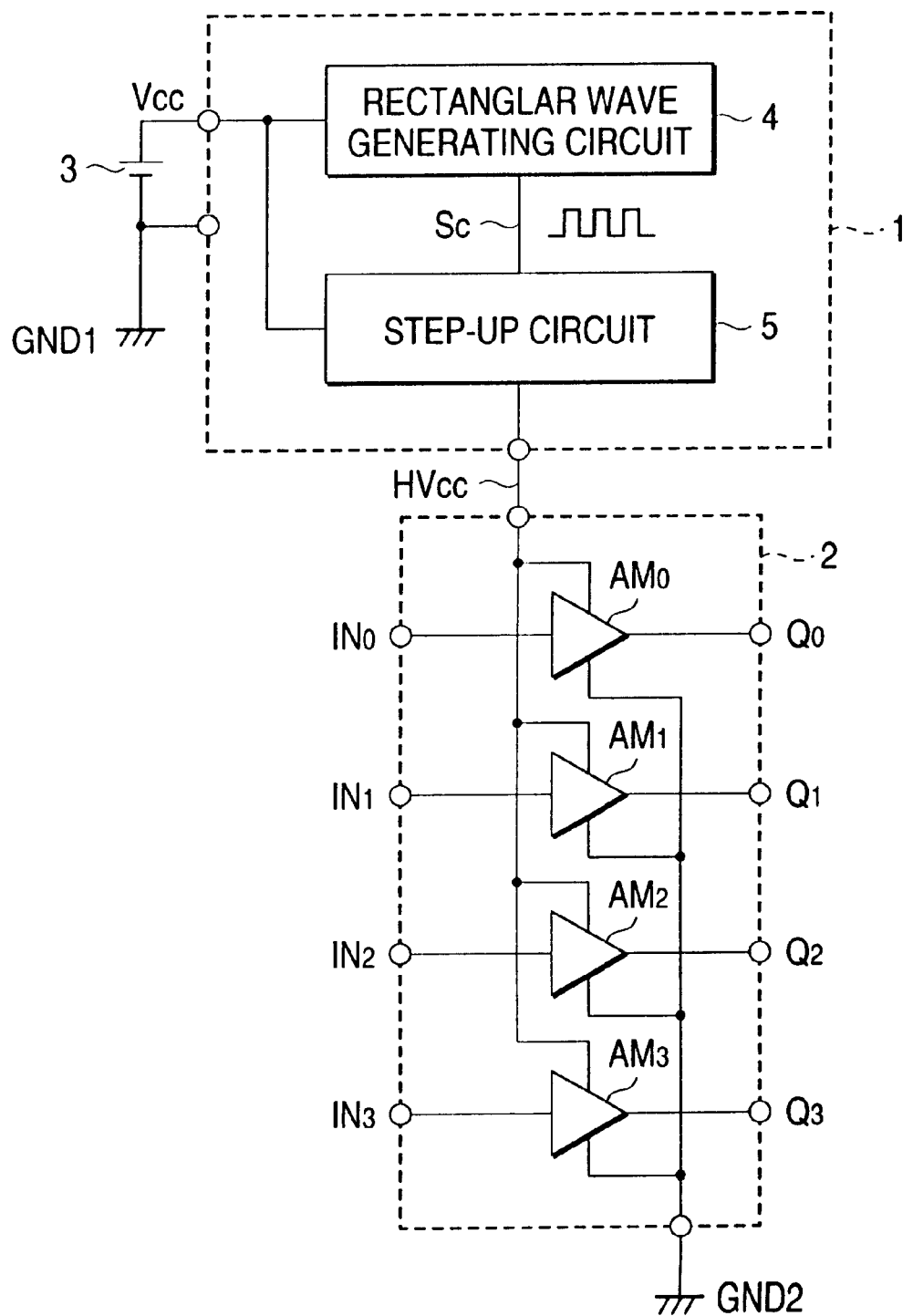
FIG. 11 is a block diagram for showing the arrangement of the electronic appliance equipped with the conventional step-up power supply circuit.

For example, as indicated in FIG. 10, the constant current source 22 is normally connected to the transistors Tr1 and Tr2 which constitute the differential pair, and the output of the amplifier 24 is fed back to the base of the transistor Tr2 in the negative feedback manner by resistors $r_f$ and $r_g$. Furthermore, while the resistor "$r_g$" is constituted by an active element such as a transistor, the amplification factor Gv set by a resistance ratio of the resistor "$r_f$" to the resistor "$r_g$" in such a manner that the ON resistance of the active element is variably controlled in response to the judging signal supplied from the judging circuit 17.

With employment of this circuit arrangement, the transistors Tr5 and Tr6 shown in FIG. 10 can be omitted. Alternatively, when the judging circuit 17 for producing such a judging signal which is changed in proportion to the step-up voltage is provided, and also the resistor "$r_f$" constituted by the above-described active element is controlled based upon this judging signal, the amplification factors Gv of the amplifiers $AM_0$ to $AM_n$ can be varied in an analog manner in response to the step-up voltage.

As previously explained, in accordance with the step-up power supply circuit of the present invention, plural sets of circuit arrangements in which the rectifying elements and the capacitive elements are connected to each other in a preselected connection relationship are connected to each other in the cascade manner, and also the rectifying elements and the capacitive elements are employed, these rectifying elements are turned ON/OFF in response to such a signal having the waveform whose amplitude becomes constant every time a preselected time period has passed, but having no rapidly changed amplitude, so that the step-up voltage is produced across the capacitive element. As a result, the occurrence of the switching noise from the rectifying elements can be suppressed, and the step-up power supply circuit capable of suppressing the occurrence of such noise can be provided.

Also, the integrated circuit device equipped with the step-up power supply circuit, according to another aspect of the present invention, is constituted by such a semiconductor integrated circuit device equipped with the step-up power supply circuit, in which the step-up power supply circuit and the circuit operated by using the step-up voltage produced from the step-up power supply circuit as the operating power supply voltage are formed on the same semiconductor substrate, comprising the judging means for judging the step-up voltage produced by the step-up power supply circuit, and the adjusting means for adjusting the operating condition of the circuit operated by using the step-up voltage as the operating power supply voltage based upon the judged result of the judging means. As a result, the operating condition of the above-explained circuit is automatically adjusted in response to the step-up voltage produced from the step-up power supply circuit. Therefore, the total number of externally provided components can be reduced, and also it is possible to provide the semiconductor integrated circuit device free from the cumbersome adjustment.

Also, the circuit operated by using the step-up voltage as the operating power supply voltage is an amplifier, and the adjusting means adjusts an amplification factor of the circuit. With employment of this arrangement, the amplification factor of the amplifier is adjusted by the adjusting means. As a consequence, the amplification factor of the amplifier is automatically adjusted by which the wide dynamic range obtained by the step-up voltage can be effectively utilized.

What is claimed is:

1. A step-up power supply circuit comprising:
    a first rectifying element and a first capacitive element series-connected between a first contact point and a second contact point;
    a second rectifying element connected between a joint point between said first rectifying element and said first capacitive element, and a third contact point;
    a second capacitive element connected between said third contact point and a fourth contact point; and
    drive means for outputting a signal having a waveform whose amplitude is not rapidly changed, but becomes constant every predetermined time period;
    wherein plural sets containing said first/second rectifying elements and said first/second capacitive elements are cascade-connected to each other in a plurality of stages; and
    wherein said first contact point of a post-staged set is connected to said third contact point of a pre-staged set; said second contact point is commonly connected; a predetermined power supply voltage is applied to said first contact point of a topmost-staged set; the signal of said drive means is supplied to said second contact point of the topmost-staged set; and said fourth contact point is set to a lower voltage than said predetermined voltage.

2. A step-up power supply circuit as claimed in claim 1 wherein said signal is a trapezoidal waveform signal.

3. A semiconductor integrated circuit device comprising either one set or plural sets of said first and second rectifying elements as recited in claim 1.

4. A semiconductor integrated circuit device equipped with a step-up power supply circuit, in which the step-up power supply circuit and a circuit operated by using a step-up voltage produced from said step-up power supply circuit as an operating power supply voltage are formed on the same semiconductor substrate, comprising:

judging means for judging the step-up voltage produced by said step-up power supply circuit; and adjusting means for adjusting an operating condition of said circuit operated by using the step-up voltage as the operating power supply voltage based upon the judged result of said judging means.

5. A semiconductor integrated circuit device as claimed in claim 4 wherein said circuit operated by using the step-up voltage as the operating power supply voltage is an amplifier; and said adjusting means adjusts an amplification factor of said circuit.

6. The circuit as claimed in claim 1, wherein the fourth contact point is connected to ground.

7. A step-up power supply circuit, comprising:

a first rectifying device and a first capacitive device connected in series between a first node and a second node;

a second rectifying device connected between a third node and a fourth node, wherein said third node is located between said first rectifying device and said first capacitive device;

a second capacitive device connected between said fourth node and a fifth node; and a waveform generating circuit that outputs a waveform signal, wherein said waveform signal oscillates such that an amplitude of said waveform signal does not rapidly change between oscillations and wherein said amplitude is constant for a predetermined time during a period of said waveform signal, wherein a constant power supply voltage is supplied to said first node, said waveform signal is supplied to said second node, and a constant ground voltage is supplied to said fifth node.

8. The circuit as claimed in claim 7, wherein said waveform generating circuit comprises:

a wave generating circuit that outputs an oscillating signal having an amplitude less than a clipping voltage;

an amplifier that amplifies said oscillating signal to at least indirectly generate said waveform signal, wherein said amplitude of said waveform signal is clipped at said clipping voltage.

9. The circuit as claimed in claim 8, wherein said waveform signal is a trapezoidal signal.

10. The circuit as claimed in claim 8, wherein said oscillating signal is a triangular wave signal.

11. The circuit as claimed in claim 9, wherein said oscillating signal is a triangular wave signal.

12. The circuit as claimed in claim 8, wherein said oscillating signal is a sine wave signal.

13. The circuit as claimed in claim 7, further comprising:

a third rectifying device and a third capacitive device connected in series between said fourth node and said second node;

a fourth rectifying device connected between a sixth node and a seventh node, wherein said sixth node is located between said third rectifying device and said third capacitive device; and a fourth capacitive device connected between said seventh node and said fifth node.

14. An apparatus, comprising:

a judging circuit that that inputs a step-up voltage generated by a power supply circuit and that produces a judging signal based on a value of the step-up voltage;

an operational circuit that is powered by the step-up voltage; and an adjustment circuit that inputs the judging signal and adjusts an operation of the operational circuit based on the judging signal.

15. The apparatus as claimed in claim 14, wherein the operational circuit comprises an amplifier and the adjustment circuit adjusts the gain of the amplifier.

16. The apparatus as claimed in claim 15, wherein the amplifier inputs an input signal and amplifies the input signal to produce an output signal that is supplied to a load.

17. The apparatus as claimed in claim 15, wherein the adjustment circuit comprises:

a first switch that inputs the judging signal and that is selectively activated in accordance with the judging signal; and a first gain adjusting circuit that controls the gain of the amplifier when the first switch is activated.

18. The apparatus as claimed in claim 17, wherein the adjustment circuit further comprises:

a second switch that inputs the judging signal and that is selectively activated in accordance with the judging signal; and a second gain adjusting circuit that controls the gain of the amplifier when the second switch is activated.

19. The circuit as claimed in claim 7, wherein a step-up voltage is generated at said fourth node and is greater than the constant power supply voltage, and wherein the circuit further comprises:

a judging circuit that that inputs the step-up voltage and produces a judging signal based on a value of the step-up voltage;

an operational circuit that is powered by the step-up voltage; and an adjustment circuit that inputs the judging signal and adjusts an operation of the operational circuit based on the judging signal.

20. The apparatus as claimed in claim 19, wherein the operational circuit is an amplifier and the adjustment circuit adjusts the gain of the amplifier.

21. The apparatus as claimed in claim 20, wherein the amplifier inputs an input signal and amplifies the input signal to produce an output signal that is supplied to a load.

* * * * *